(12) United States Patent
Kang et al.

(10) Patent No.: US 11,481,760 B2
(45) Date of Patent: Oct. 25, 2022

(54) SYSTEMS AND METHODS FOR PUSH PROVISIONING OF A FINANCIAL INSTRUMENT TO AN ELECTRONIC DEVICE FROM A BROWSER

(71) Applicant: JPMORGAN CHASE BANK, N.A., New York, NY (US)

(72) Inventors: Navneet Kang, Garnet Valley, PA (US); Janice Yoke Leng Wong, New York, NY (US); Shruti Dubey, New York, NY (US); Shruti K. Patel, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 468 days.

(21) Appl. No.: 16/434,727

(22) Filed: Jun. 7, 2019

(65) Prior Publication Data

US 2020/0387889 A1 Dec. 10, 2020

(51) Int. Cl.
*G06Q 40/00* (2012.01)
*G06Q 20/36* (2012.01)
*G06K 7/14* (2006.01)

(52) U.S. Cl.
CPC ........... *G06Q 20/36* (2013.01); *G06K 7/1417* (2013.01)

(58) Field of Classification Search
CPC ......... G06Q 40/00; G06Q 20/36; G06K 7/141
See application file for complete search history.

(56) References Cited

U.S. PATENT DOCUMENTS

| | | | |
|---|---|---|---|
| 2013/0124349 A1* | 5/2013 | Khan | G06Q 20/3278 705/21 |
| 2014/0074637 A1* | 3/2014 | Hammad | G06Q 20/3227 705/21 |
| 2015/0154597 A1* | 6/2015 | Bacastow | G06Q 20/356 705/72 |
| 2018/0032996 A1* | 2/2018 | Phillips | G06Q 20/36 |

(Continued)

FOREIGN PATENT DOCUMENTS

WO WO-2008103879 A2 * 8/2008 ........... G06Q 20/105

OTHER PUBLICATIONS

"Choosing a Mobile Wallet: The Consumer Perspective," SM Pandy, M Crowe—2017—bostonfed.org. (Year: 2017).*

*Primary Examiner* — Lalita M Hamilton
(74) *Attorney, Agent, or Firm* — Greenberg Traurig LLP

(57) ABSTRACT

Systems and methods for push provisioning of a financial instrument to an electronic device from a browser are disclosed. In one embodiment, in an information processing apparatus comprising at least one computer processor, a method for push provisioning of a financial instrument to an electronic device from a browser may include: (1) receiving, from a cardholder and at an issuer website accessed by the cardholder by a browser, a request to provision a financial instrument to an electronic wallet provided by an electronic wallet provider and executed by a mobile electronic device; (2) providing an interface to an electronic wallet provider website for the electronic wallet provider and associating the interface with a session id; (3) receiving an electronic device identifier for an electronic device and the session id from the electronic wallet provider; and (4) provisioning the financial instrument to the electronic wallet on the electronic device associated with the electronic device identifier.

14 Claims, 4 Drawing Sheets

(56) References Cited

U.S. PATENT DOCUMENTS

2019/0228405 A1* 7/2019 Sharma .............. G06Q 20/363
2019/0295054 A1* 9/2019 Purves ................ G06Q 20/28
2020/0118205 A1* 4/2020 Bloy ................. G06Q 20/4014

* cited by examiner

SYSTEMS AND METHODS FOR PUSH PROVISIONING OF A FINANCIAL INSTRUMENT TO AN ELECTRONIC DEVICE FROM A BROWSER

BACKGROUND OF THE INVENTION

1. Field of the Invention

The present disclosure generally relates to systems and methods for push provisioning of a financial instrument to an electronic device from a browser.

2. Description of the Related Art

Mobile device-based payments are increasing in popularity. In order to add a credit card to an electronic wallet, a cardholder usually enters the credit card number into an electronic wallet program or application, which then requests provisioning of the credit card from the credit card issuer.

SUMMARY OF THE INVENTION

Systems and methods for push provisioning of a financial instrument to an electronic device from a browser are disclosed. In one embodiment, in an information processing apparatus comprising at least one computer processor, a method for push provisioning of a financial instrument to an electronic device from a browser may include: (1) receiving, from a cardholder and at an issuer website accessed by the cardholder by a browser, a request to provision a financial instrument to an electronic wallet provided by an electronic wallet provider and executed by a mobile electronic device; (2) providing an interface to an electronic wallet provider website for the electronic wallet provider and associating the interface with a session id; (3) receiving an electronic device identifier for an electronic device and the session id from the electronic wallet provider; and (4) provisioning the financial instrument to the electronic wallet on the electronic device associated with the electronic device identifier.

In one embodiment, the interface may be provided as an inline frame on a webpage of the issuer website.

In one embodiment, the cardholder may select the electronic device on the electronic wallet provider website.

In one embodiment, the method may further include provisioning or providing a funding primary account number to an account associated with the electronic wallet.

In one embodiment, the method may further include receiving, from the cardholder and at the issuer website, a selection of the financial instrument to provision.

According to another embodiment, in an information processing apparatus comprising at least one computer processor, a method for push provisioning of a financial instrument to an electronic device from a browser may include: (1) receiving, from a cardholder and at an issuer website accessed by the cardholder by a browser, a request to provision a financial instrument to an electronic wallet provided by an electronic wallet provider and executed by a mobile electronic device; (2) receiving, from the cardholder and at the issuer website, a selection of the financial instrument to provision; (3) sending a registration request to provision the selected financial instrument to a backend for the electronic wallet provider; (4) receiving a machine-readable code from the electronic wallet provider, the machine-readable code comprising a registration identifier; (5) associating the registration identifier with the selected financial instrument; (6) displaying the machine-readable code; (7) receiving, from the electronic wallet provider, the registration identifier and an electronic wallet identifier for an electronic wallet; and (8) provisioning the selected financial instrument to the electronic wallet associated with the electronic wallet identifier.

In one embodiment, the machine-readable code may include a QR code.

In one embodiment, the registration identifier may be unique to the cardholder and to the selected financial instrument.

In one embodiment, the method may further include provisioning or providing a funding primary account number to an account associated with the electronic wallet identifier.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for push provisioning of a financial instrument to an electronic device from a browser.

Figure 1:
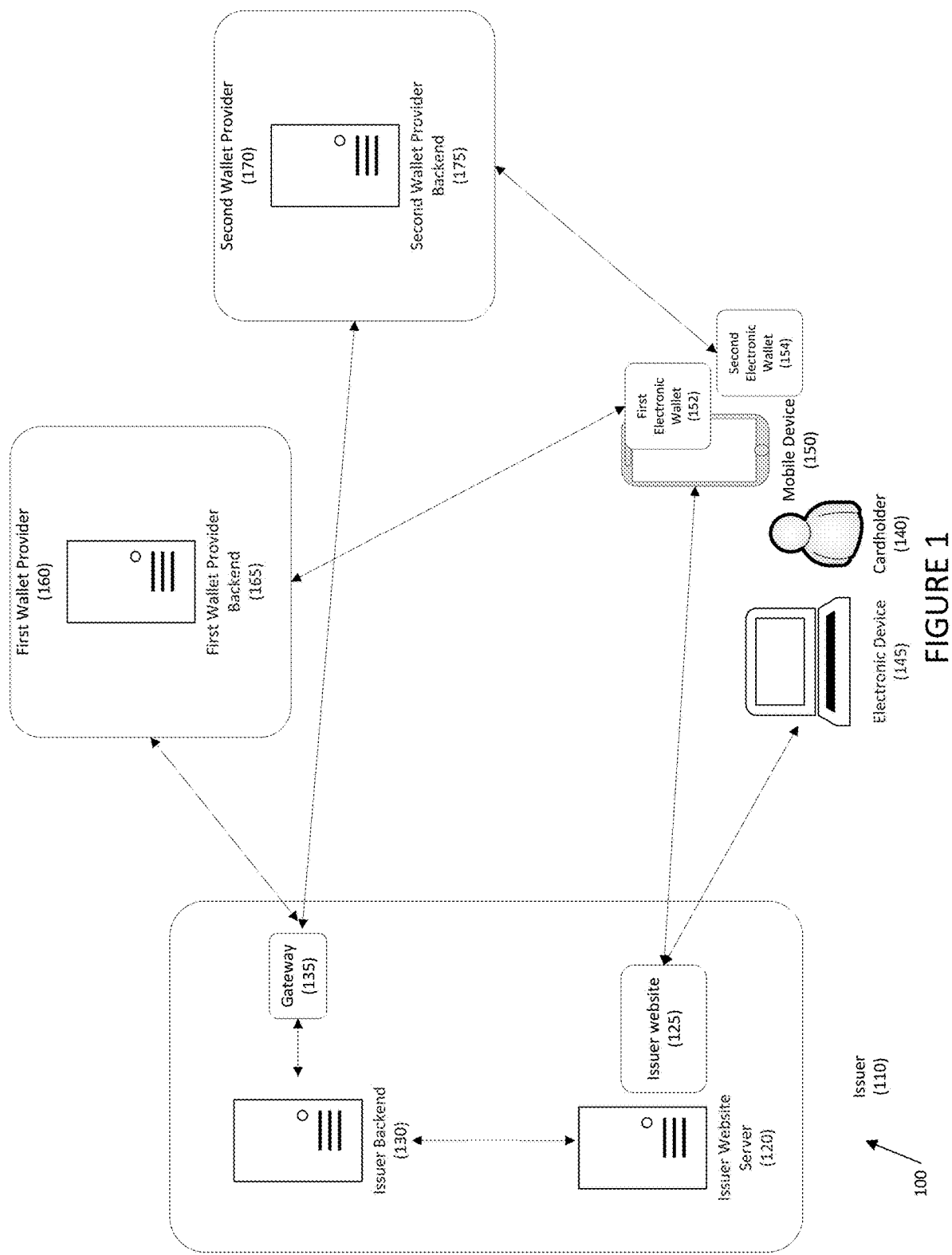
FIG. 1 depicts a system for push provisioning of a financial instrument to an electronic device from a browser according to one embodiment.

Referring to FIG. 1, a system for push provisioning of a financial instrument to an electronic device from a browser is disclosed according to one embodiment. System 100 may include issuer 110, which may be a financial institution that may issue financial instruments, such as credit cards. Issuer 110 may include website server 120, which may host issuer website 125. Issuer 110 may also include issuer backend 130. Although website server and backend 130 are depicted as single servers, it should be recognized that these elements may include multiple servers, may be hosted in the cloud, etc.

Issuer 110 may provide gateway 135 that may facilitate communications between issuer backend 130 and first wallet provider backend 165, or with second wallet provider backend 175.

Cardholder 140 may have an account with issuer 110, such as a credit card account. Cardholder 140 may access issuer website 125 using electronic device 145, which may be a computer (e.g., desktop, laptop, tablet computer, workstation, terminal, etc.), an Internet of Things (IoT) appliance, etc. Cardholder 140 may also access issuer website 125 using a browser (not shown) that may be executed by mobile device 150.

First wallet provider 160 may provide first electronic wallet 152 that is executed by mobile device 150, and may include first wallet provider backend 165. Cardholder 140 may have an account associated with first electronic wallet 152.

In one embodiment, first wallet provider 160 may be a manufacturer of mobile device 150, such as Samsung, Apple, etc.

Second wallet provider 170 may provide second electronic wallet 154 that is executed by mobile device 150, and may include second wallet provider backend 175. Cardholder 140 may have an account associated with second electronic wallet 154.

In one embodiment, second wallet provider 170 may provide an operating system (OS) for mobile device 150. An example of second wallet provider is Google.

In one embodiment, first electronic wallet 152 and/or second electronic wallet 154 may be mobile payment computer programs or applications.

Figure 2:
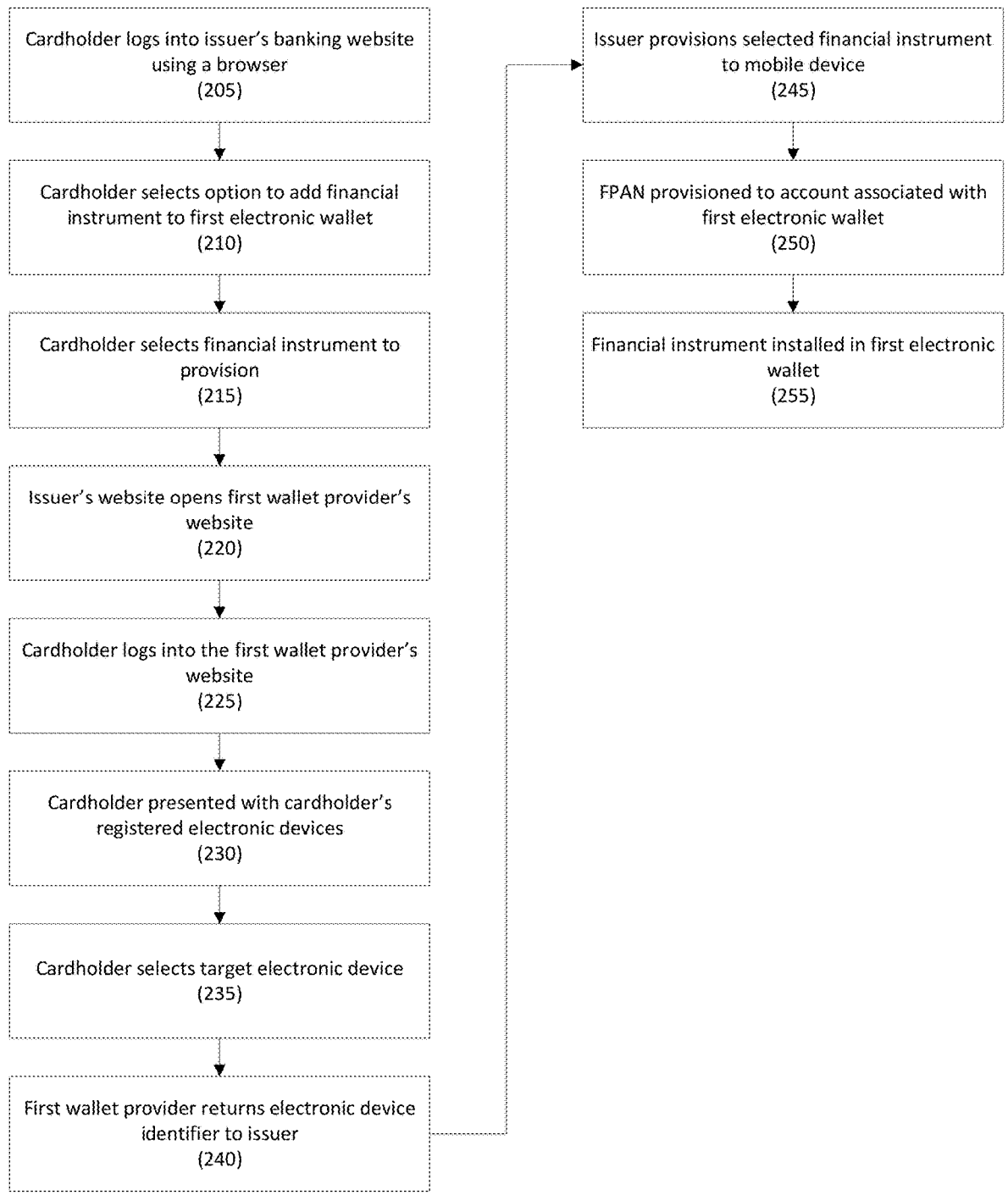
FIG. 2 depicts a method for push provisioning of a financial instrument to an electronic device from a browser according to one embodiment.

Referring to FIG. 2, a method for push provisioning of a financial instrument to an electronic device from a browser is disclosed according to one embodiment.

In step 205, a cardholder that has an account with a first wallet provider may, using a browser, login to a website hosted by an issuer, such as a credit card issuer.

In step 210, the cardholder may be given an option to provision a financial instrument issued by the issuer to the first wallet provider's electronic wallet on the cardholder's mobile device.

In step 215, the cardholder's financial instruments issued by the issuer may be displayed, and the cardholder may select a financial instrument to provision to the first electronic wallet.

In step 220, the issuer's website may open the first wallet provider's website within the issuer's website. In one embodiment, the first wallet provider may be provided in an inline frame ("iframe") that is embedded in a webpage of the issuer's website.

In one embodiment, the issuer website may generate a session id for the session with the first wallet provider.

In step 225, the cardholder may to login to the cardholder's account with the first wallet provider, and may accept any terms of service that the first wallet provider may present.

In step 230, the cardholder may be presented with the devices that the cardholder has registered with the first wallet provider, and, in step 235, may select a target electronic device for provisioning. In one embodiment, if the cardholder only has one registered electronic device, the cardholder may be asked to confirm the identification of the registered electronic device. In another embodiment, this step may be omitted.

In step 240, the first wallet provider may return a device identifier and/or a wallet identifier to the issuer. In one embodiment, this may be provided in a callback.

In one embodiment, the first wallet provider may return the session identifier with the device identifier and/or wallet identifier.

In step 245, the issuer may provision the selected financial instrument, and may push the provisioned financial instrument to the cardholder's device.

In one embodiment, the cardholder may be presented with a notification to add the provisioned financial instrument to the first wallet. In one embodiment, the provisioned financial instrument may include a token.

In step 250, the financial instrument may be installed in the first wallet on the cardholder's mobile device.

Figure 3:
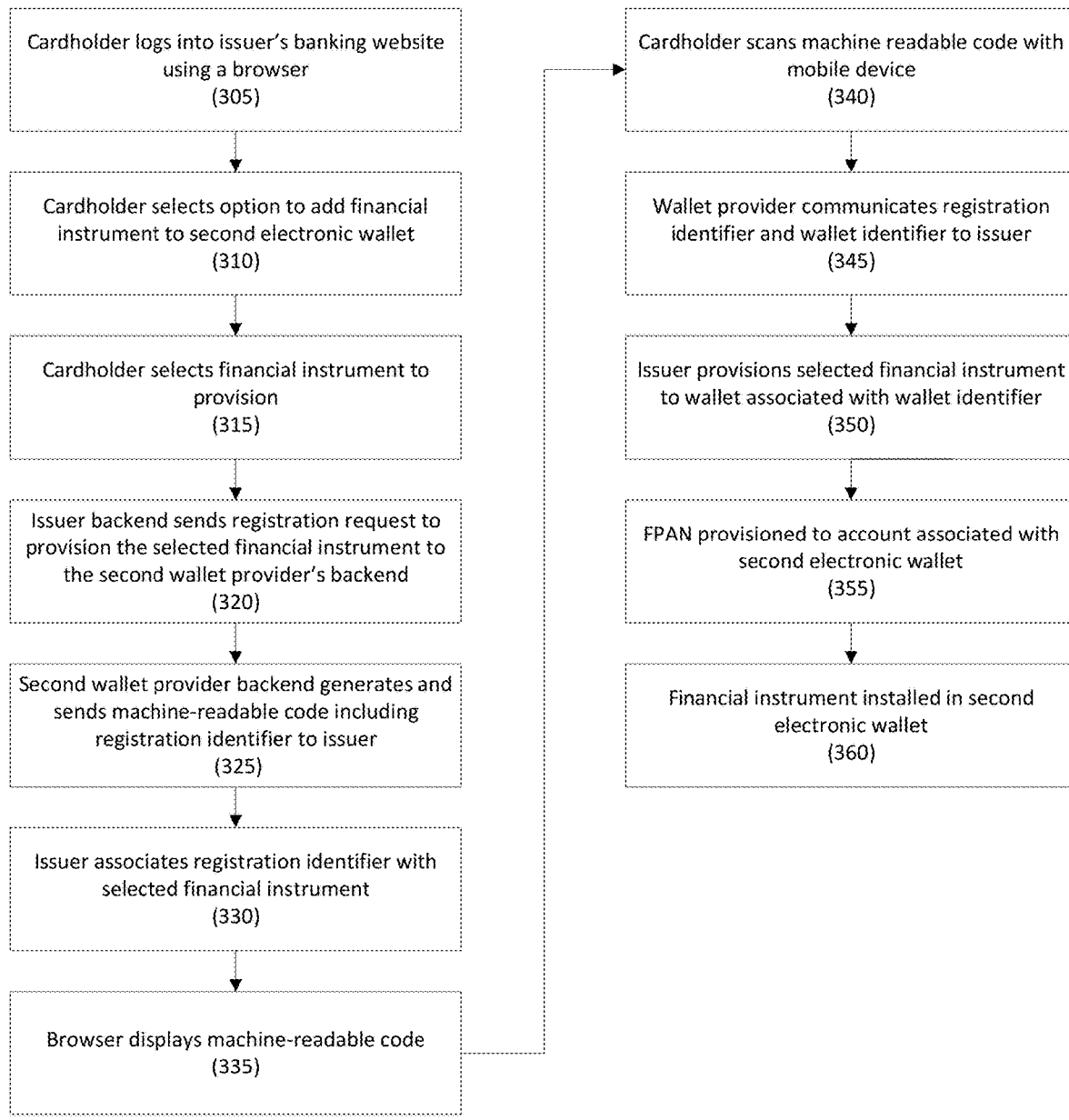
FIG. 3 depicts a method for push provisioning of a financial instrument to an electronic wallet from a browser according to one embodiment.

Referring to FIG. 3, a method for push provisioning of a financial instrument to an electronic wallet from a browser is disclosed according to one embodiment.

In step 305, a cardholder that has an account with a first wallet provider may, using a browser, login to a website hosted by an issuer, such as a credit card issuer. This may be similar to step 205, above.

In step 310, the cardholder may be given an option to provision a financial instrument issued by the issuer to the first wallet provider's electronic wallet.

In step 315, the cardholder's financial instruments issued by the issuer may be displayed, and the cardholder may select a financial instrument to provision to the first electronic wallet.

In step 320, the issuer's website may open the first wallet provider's website within the issuer's website. In one embodiment, the first wallet provider may be provided in an inline frame ("iframe") that is embedded in a webpage of the issuer's website.

In one embodiment, the issuer website may generate a session id for the session with the first wallet provider.

In step 325, the cardholder may to login to the cardholder's account with the first wallet provider, and may accept any terms of service that the first wallet provider may present.

In step 330, the first wallet provider may return the session identifier with a wallet identifier for an electronic wallet that the cardholder has with the first wallet provider.

In step 335, the issuer may provision the FPAN for the selected financial instrument to the electronic wallet associated with the wallet identifier.

In one embodiment, the cardholder may be presented with a notification to add the provisioned financial instrument to the first wallet. In one embodiment, the provisioned financial instrument may include a token.

Figure 4:
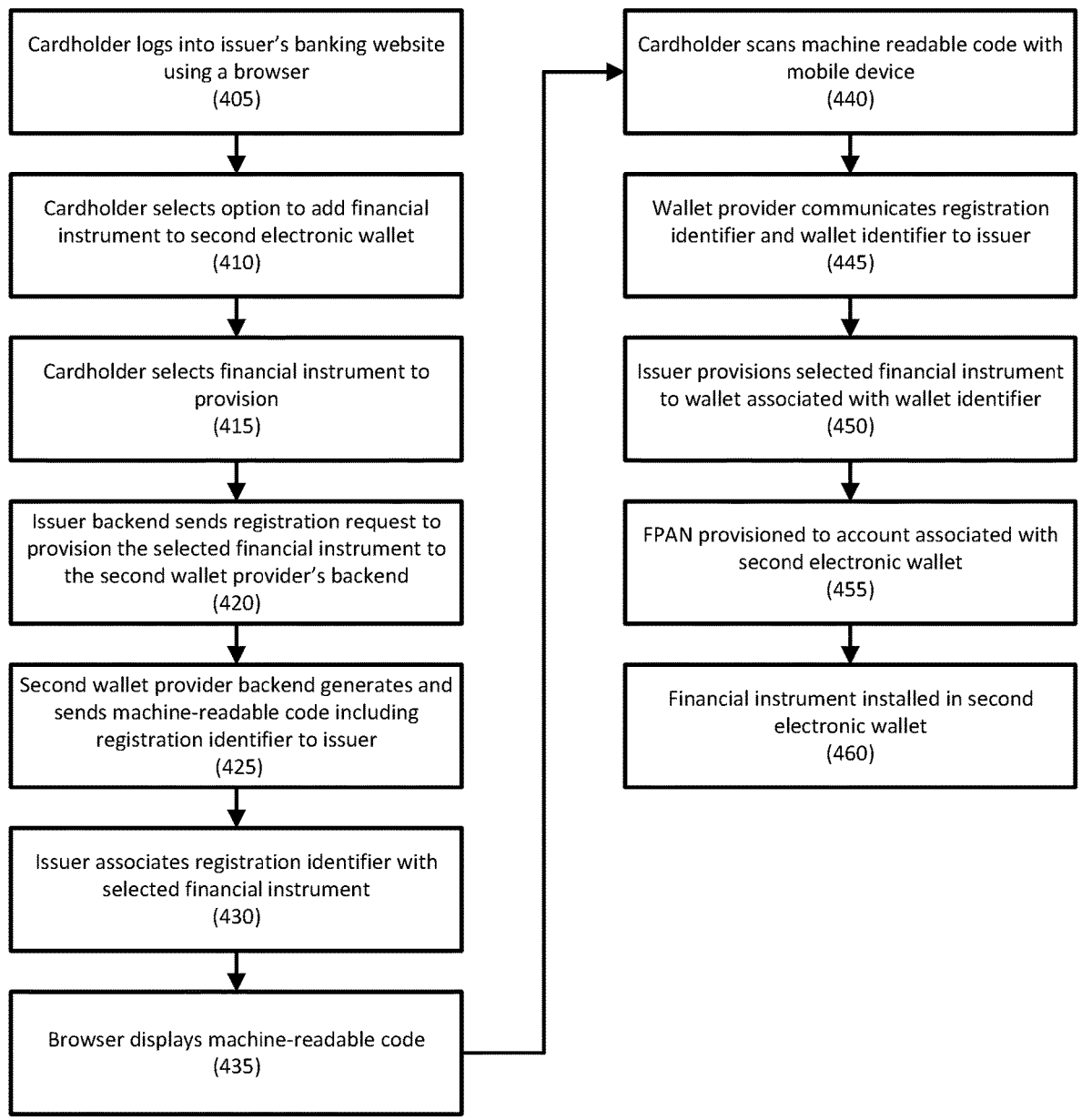
FIG. 4 depicts a method for push provisioning of a financial instrument to an electronic device from a browser according to another embodiment.

Referring to FIG. 4, a method for push provisioning of a financial instrument to an electronic device from a browser is disclosed according to another embodiment.

In step 405, a cardholder may login to the cardholder's account with an issuer using a browser.

In step 410, the cardholder may be given an option to provision a financial instrument to a second wallet provider's electronic wallet.

In step 415, the cardholder's financial instruments issued by the issuer may be displayed, and the cardholder may select a financial instrument to provision to the second electronic wallet In step 420, the issuer backend may send a registration request to the second wallet provider backend for the selected financial instrument.

In step 425, the second wallet provider backend may return a machine-readable code, such as a QR code, for the selected financial instrument to the issuer backend.

In one embodiment, the machine-readable code may include a unique registration identifier. The machine-readable code may not include information about the financial instrument.

In step 430, the issuer backend may associate the registration identifier with the selected financial instrument.

In step 435, the machine-readable code may be displayed in the browser, and in step 440, the cardholder may scan the machine-readable code using the cardholder's mobile device. In one embodiment, the second electronic wallet may scan the machine-readable code. In another embodiment, scanning the machine-readable code may cause the second electronic wallet to execute.

In step 445, the second wallet provider may communicate the registration identifier and a wallet identifier for the second electronic wallet to the issuer.

In step 450, the issuer may provision the selected financial instrument, and may push the provisioned financial instrument to the wallet associated with the wallet identifier.

In one embodiment, the provisioned financial instrument may include a token.

In one embodiment, the cardholder may be presented with a notification to add the provisioned financial instrument to the second wallet.

In step 455, the issuer may provision or provide the FPAN to an account that the cardholder may have for the second electronic wallet. In one embodiment, if the cardholder does not have second wallet installed on the cardholder's mobile device, the FPAN may be recalled from the cardholder's account and used to conduct a transaction without using the second wallet.

In step 460, the financial instrument may be installed in the second wallet on the cardholder's mobile device.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for push provisioning of a financial instrument to an electronic device from a browser, comprising:
in an information processing apparatus comprising at least one computer processor:
receiving, from a cardholder and at an issuer website accessed by the cardholder by a browser, a request to provision a financial instrument to an electronic wallet provided by an electronic wallet provider and executed by a mobile electronic device, wherein the electronic wallet provider is a manufacturer of the mobile electronic device or provides an operating system for the mobile electronic device;
providing an interface to an electronic wallet provider website for the electronic wallet provider and associating the interface with a session id;
receiving an electronic device identifier for an electronic device and the session id from the electronic wallet provider; and
provisioning the financial instrument to the electronic wallet on the electronic device associated with the electronic device identifier.

2. The method of claim 1, wherein the interface is provided as an inline frame on a webpage of the issuer website.

3. The method of claim 1, wherein the cardholder selects the electronic device on the electronic wallet provider website.

4. The method of claim 1, further comprising:
provisioning or providing a funding primary account number to an account associated with the electronic wallet.

5. The method of claim 1, further comprising:
receiving, from the cardholder and at the issuer website, a selection of the financial instrument to provision.

6. A method for push provisioning of a financial instrument to an electronic device from a browser, comprising:
in an information processing apparatus comprising at least one computer processor:
receiving, from a cardholder and at an issuer website accessed by the cardholder by a browser, a request to provision a financial instrument to an electronic wallet provided by an electronic wallet provided by an electronic wallet provider and executed by a mobile electronic device;
providing an interface to an electronic wallet provider website for the electronic wallet provider and associating the interface with a session id;
receiving an electronic wallet identifier for the electronic wallet and the session id from the electronic wallet provider; and
provisioning the financial instrument to the electronic wallet.

7. The method of claim 6, wherein the interface is provided as an inline frame on a webpage of the issuer website.

8. The method of claim 6, wherein the cardholder selects the electronic device on the electronic wallet provider website.

9. The method of claim 6, further comprising:
provisioning or providing a funding primary account number to an account associated with the electronic wallet identifier.

10. The method of claim 6, further comprising:
receiving, from the cardholder and at the issuer website, a selection of the financial instrument to provision.

11. A method for push provisioning of a financial instrument to an electronic device from a browser, comprising:
in an information processing apparatus comprising at least one computer processor:
receiving, from a cardholder and at an issuer website accessed by the cardholder by a browser, a request to provision a financial instrument to an electronic wallet provided by an electronic wallet provider and executed by a mobile electronic device;
receiving, from the cardholder and at the issuer website, a selection of the financial instrument to provision;
sending a registration request to provision the selected financial instrument to a backend for the electronic wallet provider;
receiving a machine-readable code from the electronic wallet provider, the machine-readable code comprising a registration identifier;
associating the registration identifier with the selected financial instrument; displaying the machine-readable code;
receiving, from the electronic wallet provider, the registration identifier and an electronic wallet identifier for an electronic wallet; and
provisioning the selected financial instrument to the electronic wallet associated with the electronic wallet identifier.

12. The method of claim 11, wherein the machine-readable code comprises a QR code.

13. The method of claim 11, wherein the registration identifier is unique to the cardholder and to the selected financial instrument.

14. The method of claim 11, further comprising:
provisioning or providing a funding primary account number to an account associated with the electronic wallet identifier.

* * * * *